US009742986B2

(12) United States Patent
Nemoto

(10) Patent No.: US 9,742,986 B2
(45) Date of Patent: Aug. 22, 2017

(54) IMAGE ACQUISITION APPARATUS, IMAGE OBTAINING METHOD, IMAGE OBTAINING PROGRAM, AND STORAGE MEDIUM

(71) Applicant: OLYMPUS CORPORATION, Hachioji-shi, Tokyo (JP)

(72) Inventor: Kazuhito Nemoto, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/292,060

(22) Filed: Oct. 12, 2016

(65) Prior Publication Data

US 2017/0111566 A1    Apr. 20, 2017

Related U.S. Application Data

(63) Continuation of application No. PCT/JP2015/079597, filed on Oct. 20, 2015.

(51) Int. Cl.
H04N 5/225     (2006.01)
H04N 5/232     (2006.01)
(Continued)

(52) U.S. Cl.
CPC ......... H04N 5/23212 (2013.01); G06T 7/004 (2013.01); G06T 7/20 (2013.01);
(Continued)

(58) Field of Classification Search
CPC .......... H04N 5/23212; H04N 5/23232; H04N 5/265; H04N 5/76; H04N 9/04; H04N 9/646; G06T 7/004; G06T 7/20
(Continued)

(56) References Cited

U.S. PATENT DOCUMENTS 6,570,613 B1 *  5/2003  Howell ................. H04N 9/045
                                                            348/218.1
8,466,975 B2 *  6/2013  Min ..................... H04N 9/045
                                                            348/219.1
(Continued)

FOREIGN PATENT DOCUMENTS

JP        06292094 A      10/1994
JP     2009094593 A       4/2009
(Continued)

OTHER PUBLICATIONS

International Search Report (ISR) and Written Opinion dated Dec. 22, 2015 issued in International Application No. PCT/JP2015/079597.

*Primary Examiner* — Tuan Ho
*Assistant Examiner* — Zhenzhen Wu
(74) *Attorney, Agent, or Firm* — Holtz, Holtz & Volek PC

(57) ABSTRACT

An image acquisition apparatus includes: an image acquisition device that includes normal image-acquisition pixels and a phase-difference detection pixel; a shift unit that shifts the image acquisition device; a phase-difference-pixel correcting unit that corrects a pixel value obtained by the phase-difference detection pixel to a value equivalent to values obtained by the normal image-acquisition pixels; a pixel storage unit that arranges and stores the pixel values after the correction at storage areas; and a high-resolution-image compositing unit that composites the stored pixel values to generate a high-resolution image. The shift unit shifts the image acquisition device such that pixel values that correspond to a specific color and that include the pixel value of a normal image-acquisition pixel exist at the same pixel position as the phase-difference detection pixel in the high-resolution image. The high-resolution-image compos- (Continued)

iting unit composites the pixel values corresponding to the specific color at a predetermined compositing ratio.

5 Claims, 8 Drawing Sheets

(51) Int. Cl.
  *H04N 9/04* (2006.01)
  *H04N 5/265* (2006.01)
  *G06T 7/20* (2017.01)
  *G06T 7/00* (2017.01)
  *H04N 9/64* (2006.01)
  *H04N 5/76* (2006.01)

(52) U.S. Cl.
  CPC ......... *H04N 5/23232* (2013.01); *H04N 5/265* (2013.01); *H04N 5/76* (2013.01); *H04N 9/04* (2013.01); *H04N 9/646* (2013.01)

(58) Field of Classification Search
  USPC .............................................. 348/219.1, 349
  See application file for complete search history.

(56) References Cited

U.S. PATENT DOCUMENTS

| | | | | |
|---|---|---|---|---|
| 8,890,994 | B2* | 11/2014 | Amano | G02B 7/365 |
| | | | | 348/294 |
| 8,917,327 | B1* | 12/2014 | Bishay | H04N 9/045 |
| | | | | 348/219.1 |
| 2009/0091653 | A1 | 4/2009 | Kageyama et al. | |
| 2011/0109775 | A1 | 5/2011 | Amano | |
| 2013/0050523 | A1* | 2/2013 | Kodama | H04N 5/2253 |
| | | | | 348/222.1 |
| 2013/0100338 | A1 | 4/2013 | Iwasaki | |
| 2014/0340565 | A1* | 11/2014 | Kitani | H04N 5/23212 |
| | | | | 348/349 |

FOREIGN PATENT DOCUMENTS

| | | |
|---|---|---|
| JP | 2010062640 A | 3/2010 |
| JP | 2010237400 A | 10/2010 |
| JP | 2011075677 A | 4/2011 |
| JP | 5371331 B2 | 12/2013 |
| JP | 2014236244 A | 12/2014 |
| JP | 2014239507 A | 12/2014 |
| JP | 2015076796 A | 4/2015 |
| WO | 2010024425 A1 | 3/2010 |
| WO | 2015053080 A1 | 4/2015 |

* cited by examiner

FIG. 2

| Ph | R  | Gr | R  | Ph | R  | Gr | R  |
|----|----|----|----|----|----|----|----|
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |
| Ph | R  | Gr | R  | Ph | R  | Gr | R  |
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |

FIG. 3

| Gp | R  | Gr | R  | Gp | R  | Gr | R  |
|----|----|----|----|----|----|----|----|
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |
| Gp | R  | Gr | R  | Gp | R  | Gr | R  |
| B  | Gb | B  | Gb | B  | Gb | B  | Gb |
| Gr | R  | Gr | R  | Gr | R  | Gr | R  |
| B  | Gb | B  | Gb | B  | Gb | B  | Gb |

IMAGE ACQUISITION APPARATUS, IMAGE OBTAINING METHOD, IMAGE OBTAINING PROGRAM, AND STORAGE MEDIUM

CROSS-REFERENCE TO RELATED APPLICATIONS

This is a continuation of International Application PCT/JP2015/079597, with an international filing date of Oct. 20, 2015, which is hereby incorporated by reference herein in its entirety.

TECHNICAL FIELD

The present invention relates to an image acquisition apparatus, an image obtaining method, an image obtaining program, and a storage medium.

BACKGROUND ART

There is a known image acquisition apparatus in which the optical properties of some pixels (hereinafter, referred to as phase-difference pixels) of an image acquisition device that acquires an image of a subject are made to differ from those of the other image-acquisition pixels, and the phase-difference pixels are used for focus detection, thereby eliminating a secondary optical system for focus detection (for example, see PTL 1).

A phase-difference pixel has a different aperture etc. from a normal image-acquisition pixel and obtains a different pixel value from the image-acquisition pixel; therefore, the continuity with surrounding pixel values is interrupted, and, if usual imaging processing is performed as is, the interrupted portion looks like a crack. To solve this problem, there is a known method for correcting the pixel value corresponding to the position of a phase-difference pixel through interpolation using the pixel values of surrounding image-acquisition pixels.

Furthermore, there is a known technique in which a plurality of low-resolution Bayer-array images that are acquired while shifting an image acquisition device are arranged in a high-resolution area, to obtain a higher-resolution image (hereinafter, referred to as pixel-shift super resolution) (for example, see PTL 2).

CITATION LIST

Patent Literature

{PTL 1} Publication of Japanese Patent No. 5371331
{PTL 2} Japanese Unexamined Patent Application, Publication No. 2015-076796

SUMMARY OF INVENTION

A first aspect of the present invention is directed to an image acquisition apparatus including: an image acquisition device that includes normal image-acquisition pixels periodically provided with color filters having a plurality of colors, and a phase-difference detection pixel used for focus detection; a shift unit that shifts the image acquisition device in a predetermined shift direction by a shift amount in units of subpixels; a phase-difference-pixel correcting unit that corrects, through interpolation, a pixel value obtained by the phase-difference detection pixel to a value equivalent to values obtained by the normal image-acquisition pixels; a pixel storage unit that arranges and stores the pixel value of each of the pixels of the image acquisition device, after the correction by the phase-difference-pixel correcting unit, at a storage area corresponding to the shift direction and shift amount of the shift unit; and a high-resolution-image compositing unit that composites the pixel values of the plurality of pixels stored in the pixel storage unit, thus generating a high-resolution image having a higher resolution than the resolution of the image acquisition device, wherein the shift unit shifts the image acquisition device such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and the high-resolution-image compositing unit composites the plurality of pixel values corresponding to the specific color at a predetermined compositing ratio.

A second aspect of the present invention is directed to an image obtaining method including: a shift step of shifting an image acquisition device that includes normal image-acquisition pixels periodically provided with color filters having a plurality of colors and a phase-difference detection pixel used for focus detection, in a predetermined shift direction by a shift amount in units of subpixels; a phase-difference-pixel correction step of correcting, through interpolation, a pixel value obtained by the phase-difference detection pixel to a value equivalent to values obtained by the normal image-acquisition pixels; a pixel storing step of arranging and storing the pixel value of each of the pixels of the image acquisition device, after the correction in the phase-difference-pixel correction step, at a storage area corresponding to the shift direction and shift amount in the shift step; and a high-resolution-image compositing step of compositing the pixel values of the plurality of pixels stored in the pixel storing step, thus generating a high-resolution image having a higher resolution than the resolution of the image acquisition device, wherein, in the shift step, the image acquisition device is shifted such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and, in the high-resolution-image compositing step, the plurality of pixel values corresponding to the specific color are composited at a predetermined compositing ratio.

A third aspect of the present invention is directed to an image obtaining program for causing a computer to execute: a shift step of shifting an image acquisition device that includes normal image-acquisition pixels periodically provided with color filters having a plurality of colors and a phase-difference detection pixel used for focus detection, in a predetermined shift direction by a shift amount in units of subpixels; a phase-difference-pixel correction step of correcting, through interpolation, a pixel value obtained by the phase-difference detection pixel to a value equivalent to values obtained by the normal image-acquisition pixels; a pixel storing step of arranging and storing the pixel value of each of the pixels of the image acquisition device, after the correction in the phase-difference-pixel correction step, at a storage area corresponding to the shift direction and shift amount in the shift step; and a high-resolution-image compositing step of compositing the pixel values of the plurality of pixels stored in the pixel storing step, thus generating a high-resolution image having a higher resolution than the resolution of the image acquisition device, wherein, in the shift step, the image acquisition device is shifted such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and, in the high-resolution-image compositing step, the plurality of pixel values corresponding to the specific color are composited at a predetermined compositing ratio.

A fourth aspect of the present invention is directed to a non-transitory computer-readable storage medium that stores an image obtaining program for causing a computer to execute: a shift step of shifting an image acquisition device that includes normal image-acquisition pixels periodically provided with color filters having a plurality of colors and a phase-difference detection pixel used for focus detection, in a predetermined shift direction by a shift amount in units of subpixels; a phase-difference-pixel correction step of correcting, through interpolation, a pixel value obtained by the phase-difference detection pixel to a value equivalent to values obtained by the normal image-acquisition pixels; a pixel storing step of arranging and storing the pixel value of each of the pixels of the image acquisition device, after the correction in the phase-difference-pixel correction step, at a storage area corresponding to the shift direction and shift amount in the shift step; and a high-resolution-image compositing step of compositing the pixel values of the plurality of pixels stored in the pixel storing step, thus generating a high-resolution image having a higher resolution than the resolution of the image acquisition device, wherein, in the shift step, the image acquisition device is shifted such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and, in the high-resolution-image compositing step, the plurality of pixel values corresponding to the specific color are composited at a predetermined compositing ratio.

BRIEF DESCRIPTION OF DRAWINGS

FIG. 2 is a view partially showing an example pixel arrangement of an image acquisition device of the image acquisition apparatus shown in FIG. 1.

FIG. 3 is a view showing example pixel values output from a phase-difference-pixel correcting unit of the image acquisition apparatus shown in FIG. 1.

DESCRIPTION OF EMBODIMENT

An image acquisition apparatus 100 and an image obtaining method according to one embodiment of the present invention will be described below with reference to the drawings.

Figure 1:
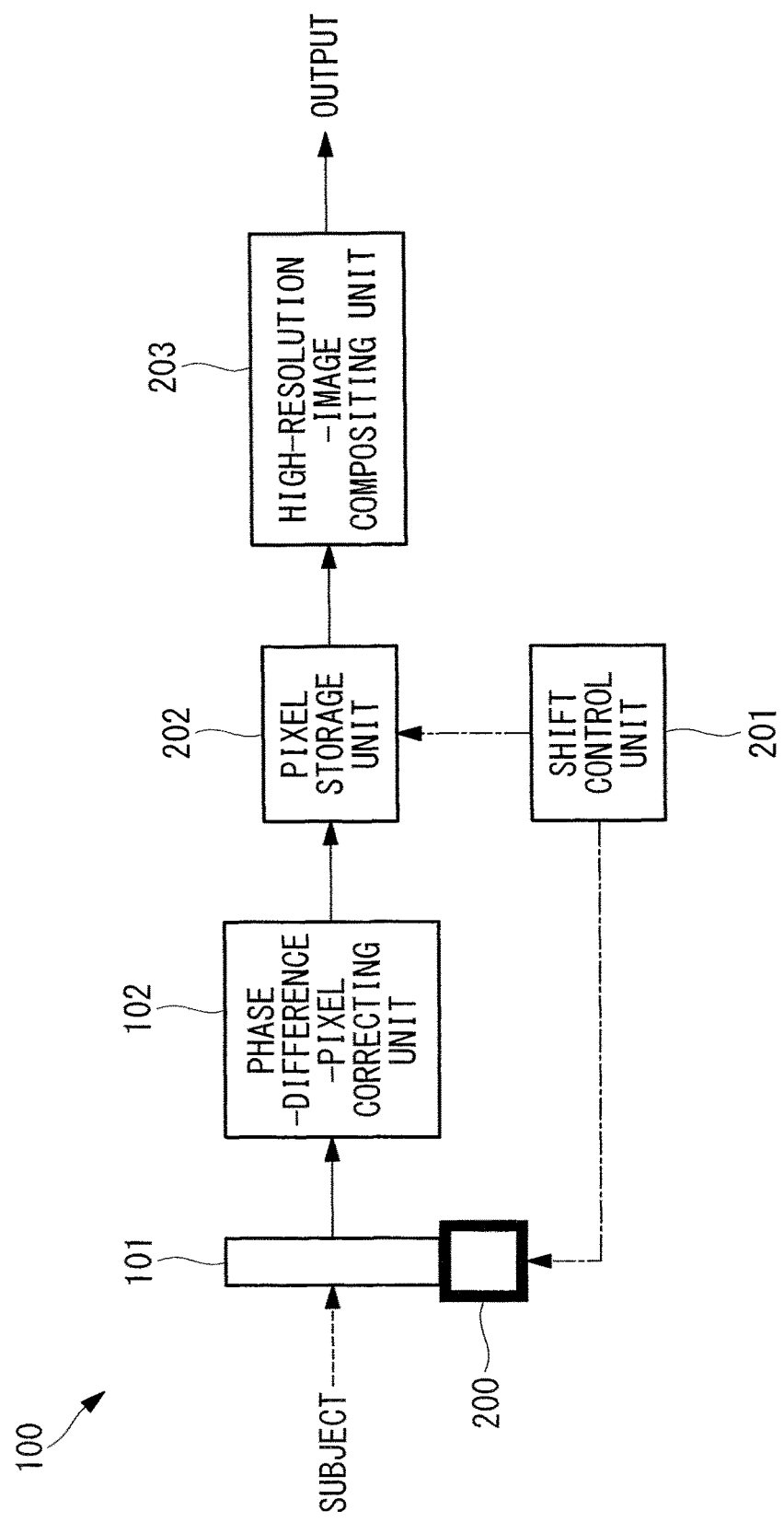
FIG. 1 is a block diagram showing an image acquisition apparatus according to one embodiment of the present invention.

As shown in FIG. 1, the image acquisition apparatus 100 of this embodiment is provided with: an image acquisition device 101, a phase-difference-pixel correcting unit 102, a shift mechanism (shift unit) 200, a shift control unit 201, a pixel storage unit 202, and a high-resolution-image compositing unit 203.

As shown in FIG. 2, the image acquisition device 101 includes: Bayer-arrayed image-acquisition pixels having color filters of a plurality of colors Gr, Gb, R, and B (hereinafter, referred to as Gr pixels, Gb pixels, R pixels, and B pixels); and phase-difference pixels Ph with which some of the Gr pixels are replaced in an alternating manner in horizontal and vertical directions. With the phase-difference pixels Ph, phase-difference image information can be obtained by providing, for example, an offset slit (not shown), instead of a color filter.

The phase-difference-pixel correcting unit 102 corrects the pixel values of the phase-difference pixels through interpolation, on the basis of pixel values received from the image acquisition device 101 (phase-difference-pixel correction step).

The shift mechanism 200 can shift the image acquisition device 101 in units of subpixels in two directions perpendicular to the center of the optical axis of the image acquisition device 101, for example, in a horizontal direction and a vertical direction perpendicular to the optical axis when the optical axis of the image acquisition device 101 is arranged in a nearly horizontal position, as shown in FIG. 1.

The shift control unit 201 controls, for each image acquisition, the direction in which the image acquisition device 101 is shifted by the shift mechanism 200 and the shift amount (shift step).

The pixel storage unit 202 arranges pixel-value data received from the phase-difference-pixel correcting unit 102 at a predetermined position on the basis of the shift direction and shift amount, which are controlled by the shift control unit 201 (pixel storing step).

The high-resolution-image compositing unit 203 applies compositing processing, to be described later, to the pixel values arranged by the pixel storage unit 202, thus compositing and outputting a high-resolution still image (high-resolution-image compositing step).

When an optical system (not shown) focuses light from a subject to form an optical image of the subject in an image plane of the image acquisition device 101, the image acquisition device 101 outputs, for each pixel, a pixel value that corresponds to the optical image of the subject entering the position of that pixel.

The phase-difference-pixel correcting unit 102 interpolates the pixel value of a phase-difference pixel Ph, among the pixel values output from the image acquisition device 101, by using the pixel values of normal image-acquisition pixels adjacent thereto, to calculate a pixel value Gp.

Interpolation methods include a simple method in which the pixel values of four diagonally-adjacent Gb pixels are averaged and a complicated method in which the direction in which the pixel values are continuous is detected, and pixel values to be used for interpolation are selected. As the method becomes more complicated, interpolation errors can be suppressed more, but it becomes difficult to implement it in the apparatus; thus, the method can be selected in consideration of image degradation.

Figure 5A:
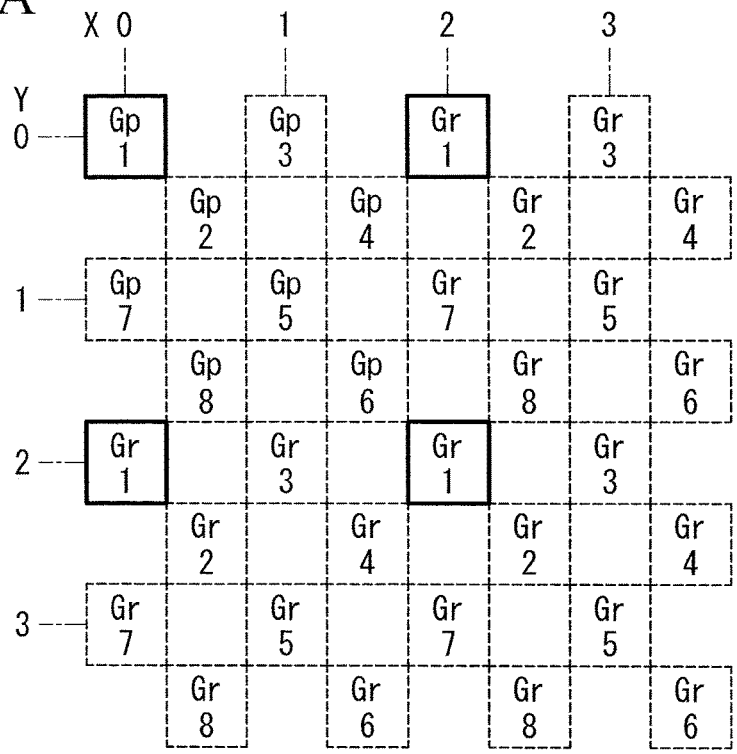
FIG. 5A is a view showing an example pixel arrangement of Gr-pixel or Gp-pixel high-resolution arrangement data obtained through the shift control shown in FIG. 4.
Figure 5B:
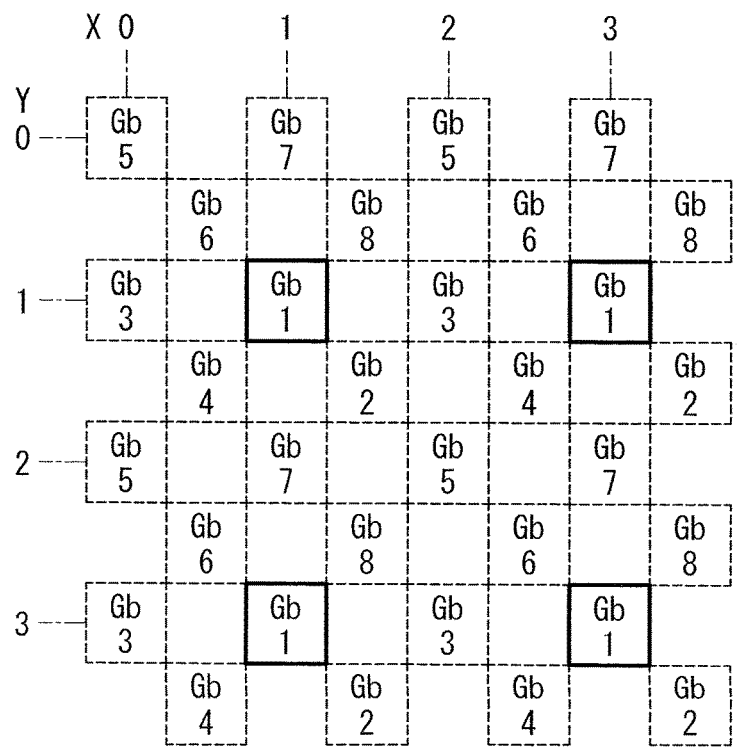
FIG. 5B is a view showing an example pixel arrangement of Gb-pixel high-resolution arrangement data obtained through the shift control shown in FIG. 4.

As shown in FIG. 5A and FIG. 5B, the shift control unit 201 performs control such that one Gr pixel or Gp pixel and one Gb pixel are arranged at the same position in a checkered-pattern high-resolution arrangement area. The Gr pixel, the Gp pixel, and the Gb pixel are pixels corresponding to a specific color G.

Figure 4:
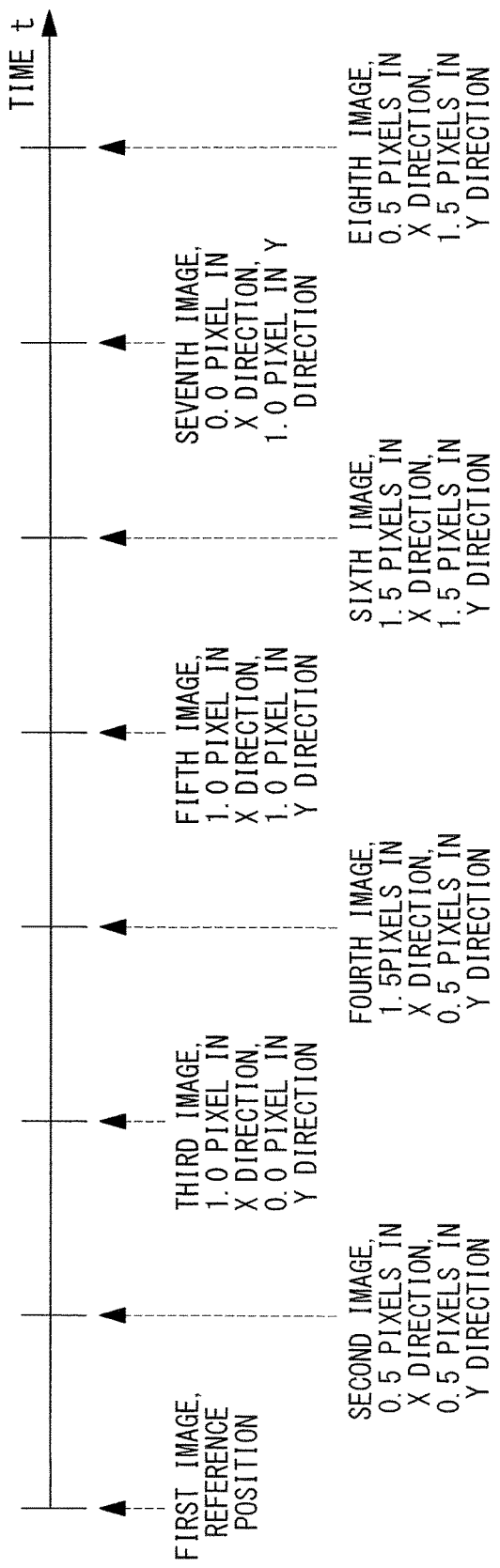
FIG. 4 is a timing chart showing example shift control performed by a shift control unit in the image acquisition apparatus shown in FIG. 1.

FIG. 4 shows a control method used by the shift control unit 201 in the image acquisition apparatus 100 of this embodiment.

In a case in which the number of image acquisitions N is 8, and a high-resolution image that is twice as large in terms of the horizontal and vertical sizes is to be generated, eight low-resolution images are acquired in time series and are obtained while shifting the image acquisition device 101, which has the Bayer-array configuration shown in FIG. 2, with the first image serving as a reference, as shown in FIG. 4, by 0.5 pixels in the X direction and 0.5 pixels in the Y direction for the second image;
by 1.0 pixel in the X direction and 0.0 pixel in the Y direction for the third image;
by 1.5 pixels in the X direction and 0.5 pixels in the Y direction for the fourth image;
by 1.0 pixel in the X direction and 1.0 pixel in the Y direction for the fifth image;
by 1.5 pixels in the X direction and 1.5 pixels in the Y direction for the sixth image;
by 0.0 pixel in the X direction and 1.0 pixel in the Y direction for the seventh image; and
by 0.5 pixels in the X direction and 1.5 pixels in the Y direction for the eighth image.

The thus-obtained low-resolution images are corrected by the phase-difference-pixel correcting unit 102, and then, pixel arrangement is performed by the pixel storage unit 202, thus obtaining high-resolution arrangement data, as shown in FIGS. 5A to 5D. FIGS. 5A to 5D show a range in which four pixels in the horizontal and vertical directions shown in FIG. 3 are arranged.

FIG. 5A shows high-resolution arrangement data in which Gr pixels or Gp pixels in the first to eighth images are arranged (the numerical value in each pixel indicates the order of image acquisition). Furthermore, FIG. 5B shows high-resolution arrangement data in which Gb pixels in the first to eighth images are arranged.

Figure 5C:
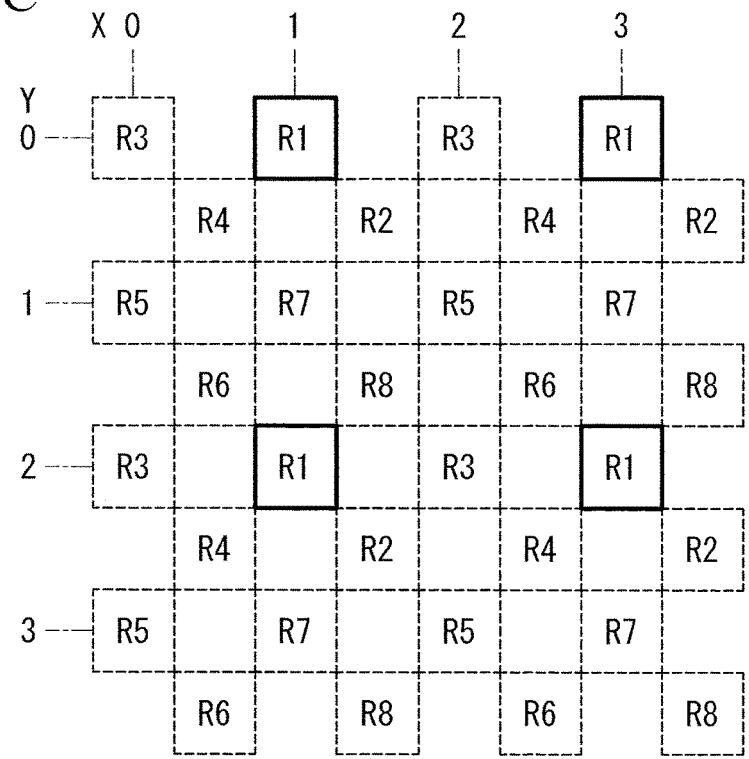
FIG. 5C is a view showing an example pixel arrangement of R-pixel high-resolution arrangement data obtained through the shift control shown in FIG. 4.
Figure 5D:
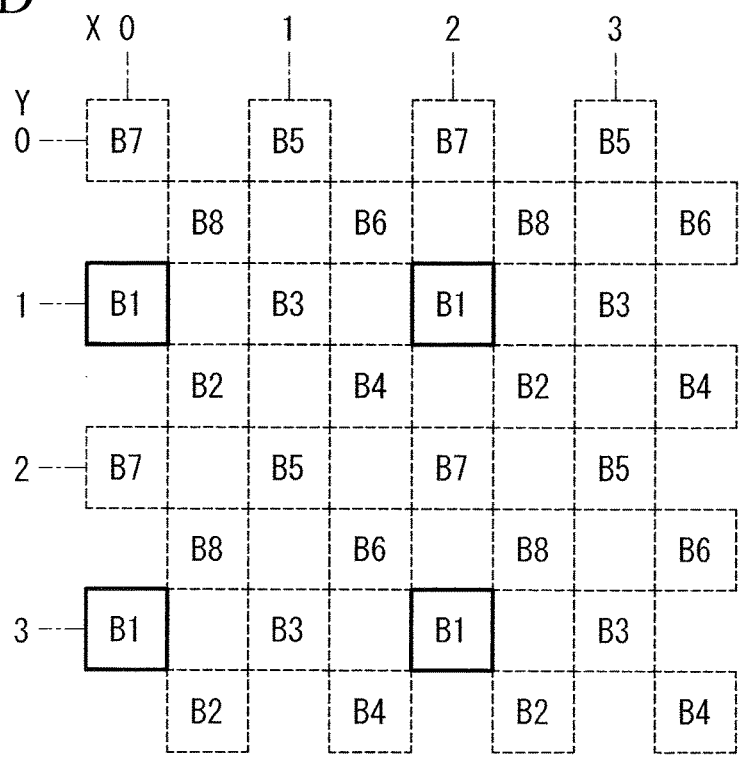
FIG. 5D is a view showing an example pixel arrangement of B-pixel high-resolution arrangement data obtained through the shift control shown in FIG. 4.

One Gr pixel or Gp pixel and one Gb pixel are arranged at the same position, and at least one of them is a color-G pixel derived from the normal image-acquisition pixel. Furthermore, for R pixels and B pixels, high-resolution arrangement data in which the corresponding pixels are arranged in a checkered pattern is similarly obtained (FIG. 5C and FIG. 5D).

The high-resolution-image compositing unit 203 generates RGB three-plane data from the high-resolution arrangement data (Gr or Gp, Gb, R, and B checkered-pattern), which is generated by the pixel storage unit 202.

Here, the value of G, among the RGB colors, is set to one pixel value Gs by taking the weighted average of Gr or Gp and Gb arranged at the same position.

A weight W_Gb (0 to 1) for a Gb pixel arranged at the position of a Gp pixel derived from the phase-difference pixel is calculated as follows.

First, a local contrast value at that position is calculated from the pixel values of Gb pixels adjacent to the position of the Gp pixel. Here, Gb pixels are used because the color G can be generally substituted for a brightness value and because there are no phase-difference pixels in this embodiment.

Here, a maximum value Gb_max and a minimum value Gb_min are found in the range of 5×5 pixels with that position located at the center, and calculation is performed as follows, Contrast value contr=$Gb\_max - Gb\_min$.

Weight for Gb: $W\_Gb = f1(contr)$

Figure 6:
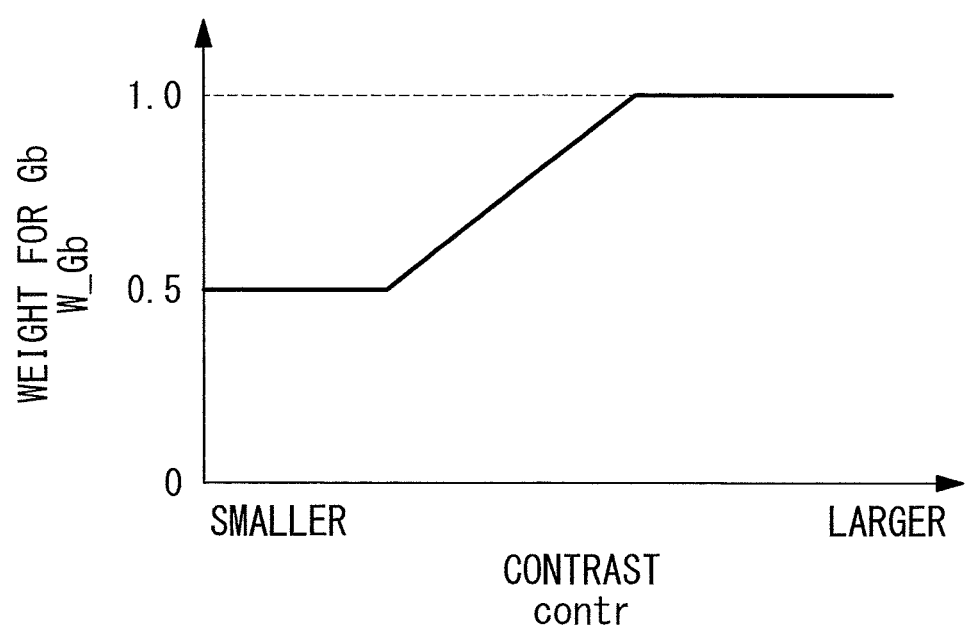
FIG. 6 is a view showing the relationship between the contrast and a weight that is used for a weighted average between the pixel value of a Gr pixel or Gp pixel and the pixel value of a Gb pixel, shown in FIGS. 5A and 5B.

Here, the function f1 is set such that the weight for Gb is set to 1.0 as the contrast becomes larger and is set to 0.5 as the contrast becomes smaller, as shown in FIG. 6. The function f1 can be adjusted according to the noise level of an image or the interpolation method.

Furthermore, W_Gb is equal to 0.5 at the position of a Gr pixel, which is not derived from the phase-difference pixel.

Then, the weighted average value Gs is calculated as follows, $$Gs = Gb*W\_Gb + Gr*(1.0 - W\_Gb) \qquad (1).$$

In an ideal situation, only the Gb pixel can be used at the position of the phase-difference pixel; however, the Gr pixel and the Gb pixel at the same position are not obtained at the same timing due to the configuration, and thus a pixel-value difference may be caused due to a fluctuation in illumination or the like. Thus, averaging the pixel values of the Gr pixel and the Gb pixel has an effect of suppressing the appearance of this pixel-value difference in the output image in the form of an artifact.

Because an error in the phase-difference-pixel interpolated value tends to be larger in a high-contrast area, the weight for the pixel value of the Gb pixel is increased, thereby making it possible to approach the original value and to reproduce the original resolution of the subject. On the other hand, the pixel-value difference due to a fluctuation in illumination or the like is not noticeable in a high-contrast area.

In a low-contrast area, an error in interpolation is small, and, if only the Gb pixel is used at the phase-difference-pixel position, the difference due to a fluctuation in illumination or the like is noticeable compared with surrounding areas where the pixel values of the Gb pixel and the Gr pixel are equally averaged; therefore, it is preferred that the pixel values of the Gb pixel and the Gr pixel be equally averaged as in the surrounding areas.

The high-resolution-image compositing unit 203 interpolates positions where pixel values do not exist in the thus-generated Gs, R, and B checkered patterns and outputs them as RGB three-plane data. Finally, an image processing unit (not shown) receives the RGB three-plane data, performs processing, such as gradation conversion, and generates an output image to be displayed or stored.

In this way, according to the image acquisition apparatus 100 of this embodiment, the shift direction and shift amount are controlled such that one Gr pixel or Gp pixel and one Gb pixel are arranged at the same position in the checkered-pattern high-resolution arrangement data, and obtained pixel values are subjected to weighted averaging with a weight according to the local contrast at the pixel; therefore, there is an advantage that it is possible to correct an error in phase-difference-pixel interpolation and also to effectively correct a fluctuation caused between low-resolution images. Accordingly, it is possible to prevent resolution degradation while suppressing the occurrence of artifacts.

On the other hand, in PTL 1, the size of the spatial frequency (standard deviation divided by average) is used for phase-difference-pixel correction control. Spatial frequency is a concept partially similar to contrast; however, calculation of spatial frequency is more complicated than that of contrast, thus requiring a great deal of calculation. According to this embodiment, even when the frequency is high, if the amplitude component is small, an error in correction is not likely to be noticeable; thus, there is an advantage in using the contrast.

Furthermore, the weighted average of G pixels in terms of the contrast is not necessarily limited only to phase-difference pixels and may be applied to all G pixels in order to improve the continuity of an image. In this case, if only the Gb pixel is used, the difference due to a fluctuation in the illumination or the like, which is caused by the different image-acquisition timing at each pixel position, appears as a pixel-value difference between adjacent pixels in the Gb high-resolution arrangement data; therefore, averaging of the pixel values of the Gb pixel and the Gr pixel is effective.

Figure 7:
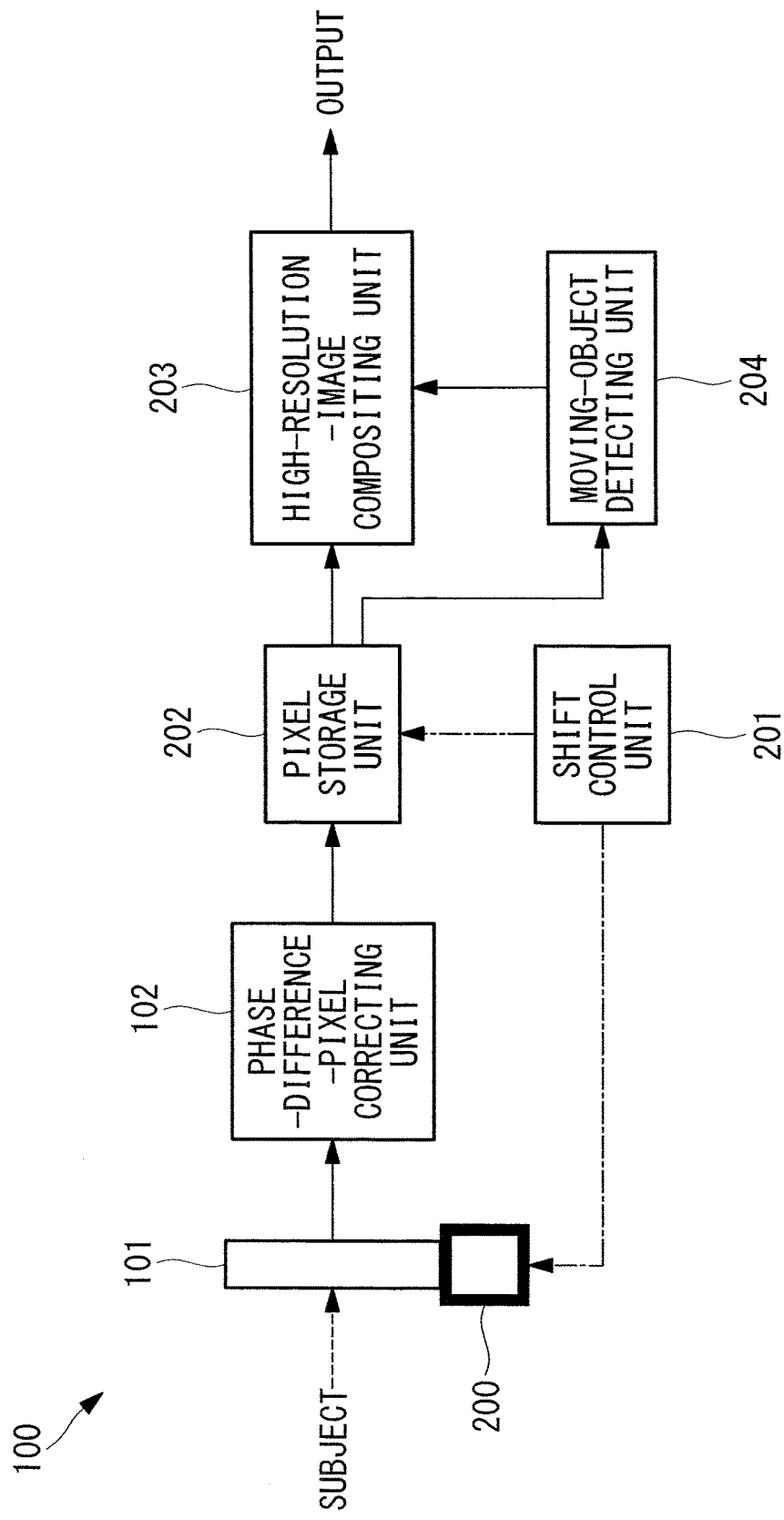
FIG. 7 is a block diagram showing a modification of the image acquisition apparatus shown in FIG. 1.

Note that, in this embodiment, as shown in FIG. 7, a moving-object detecting unit 204 may be further provided.

The moving-object detecting unit 204 detects, for each pixel, whether or not a moving object exists during image acquisition of a plurality of low-resolution images, from the high-resolution arrangement data output from the pixel storage unit 202.

Then, in an area where the existence of a moving object is detected in the moving-object detecting unit 204, there exists a pixel at which the pixel values of the Gb pixel and the Gr pixel belong to mutually different ones of the moving object and the background, depending on the timing of acquisition of low-resolution images and the movement of the moving object; thus, by using the fact that the difference value at that pixel becomes large, a value that becomes larger as the possibility of existence of the moving object increases (moving-object degree, Pmove) is generated for each pixel.

At this time, at the position of a phase-difference pixel, it is desirable that detection of a moving object not be performed because the difference value becomes large due to an error in pixel-value interpolation, and thus, the moving-object degree becomes large even though a moving object does not exist, in some cases. If needed, it is possible to perform spatial interpolation of the moving-object degree at the position of a phase-difference pixel.

In an area where the existence of a moving object is detected, the pixel values for the moving object and the background are discontinuously arranged in spatial directions, from the relationship between the image-acquisition timing and the arrangement; therefore, the Gb-pixel high-resolution arrangement data becomes a disordered image in which the moving object and the background are mixed in spatial directions, and the contrast calculated using Gb pixels becomes a large value in some cases.

For example, during low-resolution image acquisition, in an area that belongs to the background in the first to fourth images and belongs to a moving object in the fifth to eighth images, the pixel values for the background and the pixel values for the moving object are arranged alternately for every two rows in the Gb-pixel high-resolution arrangement data, shown in FIG. 5B. Furthermore, at this time, the background and the moving object are opposite in the Gr-pixel high-resolution arrangement data, shown in FIG. 5A.

In this area, the Gr-pixel high-resolution arrangement data is similarly disordered; however, the imaging timing differs from that of the Gb pixel at the same pixel position, and thus, the pixel value of the Gb pixel and the pixel value of the Gr pixel are equally averaged, thereby making it possible to reduce the disordered degree.

To realize this, it is necessary to make the Gb weight W_Gb in terms of the contrast, shown in Expression (1), approach 0.5 as the moving-object degree Pmove increases.

$$W\_Gb = f2(W\_Gb, P\text{move})$$

Figure 8:
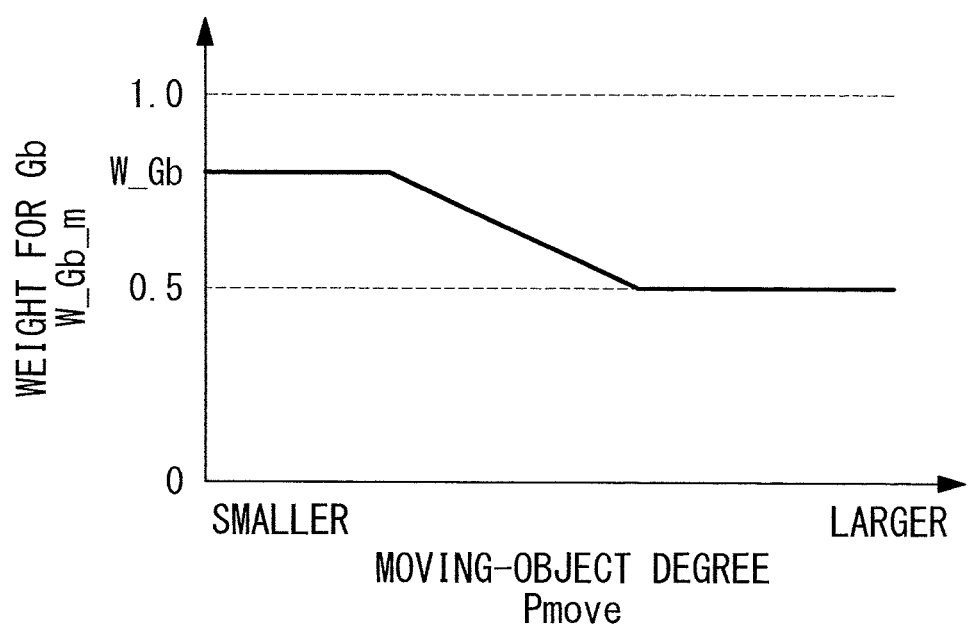
FIG. 8 is a view showing the relationship between a moving-object degree detected by a moving-object detecting unit shown in FIG. 7 and a weight for Gb.

FIG. 8 shows an example function f2. The function f2 may be adjusted according to the nature etc. of the moving object.

In the above-described embodiment, a description has been given of a case in which the resolution is twice as large in terms of the horizontal and vertical sizes; however, if the control accuracy for a subpixel shift of the shift mechanism 200 is sufficient, the magnification may be set to twice as large as or more. Furthermore, the shift direction, shift order, and shift amount of the image acquisition device 101 to be shifted by the shift control unit 201 may also be set to a desired pattern.

Furthermore, in the above-described embodiment, an example case in which only G pixels include phase-difference pixels is shown; however, the present invention is not limited to G pixels and can be applied to an image acquisition device in which another color filter includes phase-difference pixels.

Furthermore, the image obtaining method of this embodiment can be performed by the above-described image acquisition apparatus 100 as well as by an image obtaining program that can be executed by a computer. In this case, the image obtaining method of this embodiment is performed when a processor, such as a CPU, executes the image obtaining program.

Specifically, the image obtaining program stored in a storage medium is read, and the read image obtaining program is executed by the processor, such as a CPU. Here, the storage medium stores a program, data, etc., and the function thereof can be realized by an optical disk (DVD, CD, etc.), a hard disk drive, a memory (card memory, ROM, etc.), or the like.

As a result, the above-described embodiment derives the following aspects.

A first aspect of the present invention is directed to an image acquisition apparatus including: an image acquisition device that includes normal image-acquisition pixels periodically provided with color filters having a plurality of colors, and a phase-difference detection pixel used for focus detection; a shift unit that shifts the image acquisition device in a predetermined shift direction by a shift amount in units of subpixels; a phase-difference-pixel correcting unit that corrects, through interpolation, a pixel value obtained by the phase-difference detection pixel to a value equivalent to values obtained by the normal image-acquisition pixels; a pixel storage unit that arranges and stores the pixel value of each of the pixels of the image acquisition device, after the correction by the phase-difference-pixel correcting unit, at a storage area corresponding to the shift direction and shift amount of the shift unit; and a high-resolution-image compositing unit that composites the pixel values of the plurality of pixels stored in the pixel storage unit, thus generating a high-resolution image having a higher resolution than the resolution of the image acquisition device, wherein the shift unit shifts the image acquisition device such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and the high-resolution-image compositing unit composites the plurality of pixel values corresponding to the specific color at a predetermined compositing ratio.

According to this aspect, the image acquisition device, which includes the normal image-acquisition pixels and the phase-difference detection pixel, is shifted by the shift unit, image acquisition is repeated, the pixel value obtained by the phase-difference pixel is corrected, by the phase-difference-pixel correcting unit, to a value equivalent to values obtained by the normal image-acquisition pixels, and is arranged and stored by the pixel storage unit at a storage area corresponding to the shift direction and shift amount of the shift unit, and the high-resolution-image compositing unit composites the pixel values of a plurality of pixels stored in the storage area, thereby generating a high-resolution image having a higher resolution than the resolution of the image acquisition device.

In this case, the shift unit shifts the image acquisition device such that a plurality of pixel values that correspond to the specific color and that include the pixel value of a normal image-acquisition pixel exist at the same pixel position as the phase-difference detection pixel in the high-resolution image, and the high-resolution-image compositing unit composites the plurality of pixel values corresponding to the specific color at the predetermined compositing ratio; therefore, it is possible to composite a high-resolution image by using the pixel values of normal image-acquisition pixels, without using the pixel value of a phase-difference detection pixel in compositing a high-resolution image, and to prevent resolution degradation. Furthermore, the pixel values of a plurality of pixels that are not obtained at the same timing are composited, thereby making it possible to reduce the occurrence of pixel-value difference due to a fluctuation in illumination or the like and to suppress the occurrence of artifacts.

In the above-described aspect, the high-resolution-image compositing unit may control the compositing ratio on the basis of the contrast at the position corresponding to at least the phase-difference detection pixel in the high-resolution image.

In a high-contrast area, an error in correction through interpolation of a phase-difference detection pixel tends to be larger, and the pixel-value difference due to a fluctuation in illumination or the like is not noticeable. Furthermore, in a low-contrast area, an error in correction through interpolation of a phase-difference detection pixel is small, and the pixel-value difference due to a fluctuation in illumination or the like tends to be noticeable. Therefore, the influences of an error in correction and the pixel-value difference due to a fluctuation in illumination or the like can be suppressed by controlling the compositing ratio on the basis of the contrast.

In the above-described aspect, it is possible to further include a moving-object detecting unit that detects a moving-object degree at the position of a pixel at which a plurality of pixel values in the same color exist, from the pixel values at the pixel, wherein the high-resolution-image compositing unit may control the compositing ratio on the basis of the moving-object degree at that position.

By doing so, in an area where a moving object exists, the pixel values for the moving object and the pixel values for the background are discontinuously arranged in spatial directions, from the relationship between the image-acquisition timing and the arrangement; therefore, the compositing ratio of the plurality of pixel values is controlled on the basis of the moving-object degree, thereby making it possible to average irregularities in the image to reduce the degree of irregularity.

Furthermore, in the above-described aspect, the moving-object detecting unit may not use the corrected pixel value of the phase-difference detection pixel to detect the moving-object degree.

By doing so, because the accuracy of moving-object detection decreases at the position of a phase-difference detection pixel, the moving-object degree can be accurately detected without using the pixel value thereof.

A second aspect of the present invention is directed to an image obtaining method including: a shift step of shifting an image acquisition device that includes normal image-acquisition pixels periodically provided with color filters having a plurality of colors and a phase-difference detection pixel used for focus detection, in a predetermined shift direction by a shift amount in units of subpixels; a phase-difference-pixel correction step of correcting, through interpolation, a pixel value obtained by the phase-difference detection pixel to a value equivalent to values obtained by the normal image-acquisition pixels; a pixel storing step of arranging and storing the pixel value of each of the pixels of the image acquisition device, after the correction in the phase-difference-pixel correction step, at a storage area corresponding to the shift direction and shift amount in the shift step; and a high-resolution-image compositing step of compositing the pixel values of the plurality of pixels stored in the pixel storing step, thus generating a high-resolution image having a higher resolution than the resolution of the image acquisition device, wherein, in the shift step, the image acquisition device is shifted such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and, in the high-resolution-image compositing step, the plurality of pixel values corresponding to the specific color are composited at a predetermined compositing ratio.

A third aspect of the present invention is directed to an image obtaining program for causing a computer to execute: a shift step of shifting an image acquisition device that includes normal image-acquisition pixels periodically provided with color filters having a plurality of colors and a phase-difference detection pixel used for focus detection, in a predetermined shift direction by a shift amount in units of subpixels; a phase-difference-pixel correction step of correcting, through interpolation, a pixel value obtained by the phase-difference detection pixel to a value equivalent to values obtained by the normal image-acquisition pixels; a pixel storing step of arranging and storing the pixel value of each of the pixels of the image acquisition device, after the correction in the phase-difference-pixel correction step, at a storage area corresponding to the shift direction and shift amount in the shift step; and a high-resolution-image compositing step of compositing the pixel values of the plurality of pixels stored in the pixel storing step, thus generating a high-resolution image having a higher resolution than the resolution of the image acquisition device, wherein, in the shift step, the image acquisition device is shifted such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and, in the high-resolution-image compositing step, the plurality of pixel values corresponding to the specific color are composited at a predetermined compositing ratio.

A fourth aspect of the present invention is directed to a non-transitory computer-readable storage medium that stores an image obtaining program for causing a computer to execute: a shift step of shifting an image acquisition device that includes normal image-acquisition pixels periodically provided with color filters having a plurality of colors and a phase-difference detection pixel used for focus detection, in a predetermined shift direction by a shift amount in units of subpixels; a phase-difference-pixel correction step of correcting, through interpolation, a pixel value obtained by the phase-difference detection pixel to a value equivalent to values obtained by the normal image-acquisition pixels; a pixel storing step of arranging and storing the pixel value of each of the pixels of the image acquisition device, after the correction in the phase-difference-pixel correction step, at a storage area corresponding to the shift direction and shift amount in the shift step; and a high-resolution-image compositing step of compositing the pixel values of the plurality of pixels stored in the pixel storing step, thus generating a high-resolution image having a higher resolution than the resolution of the image acquisition device, wherein, in the shift step, the image acquisition device is shifted such that a plurality of pixel values that correspond to a specific color of at least one type of the color filters provided for the normal image-acquisition pixels and that include the pixel value of at least one of the normal image-acquisition pixels exist at the same pixel position as the phase-difference detection pixel in the high-resolution image; and, in the high-resolution-image compositing step, the plurality of pixel values corresponding to the specific color are composited at a predetermined compositing ratio.

According to the present invention, an advantageous effect is afforded in that it is possible to correct both resolution degradation caused by errors in interpolation of phase-difference pixels and artifacts caused by fluctuations in pixel values between low-resolution images.

REFERENCE SIGNS LIST 100 image acquisition apparatus
101 image acquisition device
102 phase-difference-pixel correcting unit
200 shift mechanism (shift unit)
202 pixel storage unit
203 high-resolution-image compositing unit
204 moving-object detecting unit

The invention claimed is:

1. An image acquisition apparatus comprising:
  an image acquisition device that includes normal image-acquisition pixels periodically provided with color filters having a plurality of colors, and a phase-difference detection pixel used for focus detection;
  a shift mechanism that is configured to shift the image acquisition device; and
  a hardware processor that, under control of a program stored in a memory, performs:
    shifting, by controlling the shift mechanism, the image acquisition device in a predetermined shift direction by a shift amount in units of subpixels;
    correcting, through interpolation, a pixel value obtained by the phase-difference detection pixel to a value equivalent to values obtained by the normal image-acquisition pixels;
    arranging and storing the pixel value of each of the pixels of the image acquisition device corrected in the correcting at a storage area corresponding to the shift direction and shift amount of the image acquisition device shifted in the shifting; and
    compositing the pixel values of the plurality of pixels stored in the storing, thereby generating a high-resolution image having a higher resolution than a resolution of the image acquisition device,
  wherein:
    in the shifting, the image acquisition device is shifted such that a plurality of pixel values that correspond to a specific color of at least one type of the color filters provided for the normal image-acquisition pixels and that include the pixel value of at least one of the normal image-acquisition pixels exist at a same pixel position as the phase-difference detection pixel in the high-resolution image,
    in the compositing, the plurality of pixel values corresponding to the specific color are composited at a predetermined compositing ratio, and
    in the compositing, the compositing ratio is controlled based on a contrast at a position corresponding to at least the phase-difference detection pixel in the high-resolution image.

2. The image acquisition apparatus according to claim 1, wherein the hardware processor, under control of the program stored in the memory, further performs:
  detecting a moving-object degree at a position of a pixel at which a plurality of pixel values corresponding to a same color exist, from the pixel values at the pixel, and
  wherein, in the compositing, the compositing ratio is further controlled based on the detected moving-object degree.

3. The image acquisition apparatus according to claim 2, wherein the corrected pixel value of the phase-difference detection pixel is not used to detect the moving-object degree.

4. An image obtaining method comprising:
  shifting an image acquisition device that includes normal image-acquisition pixels periodically provided with color filters having a plurality of colors and a phase-difference detection pixel used for focus detection, in a predetermined shift direction by a shift amount in units of subpixels;
  correcting, through interpolation, a pixel value obtained by the phase-difference detection pixel to a value equivalent to values obtained by the normal image-acquisition pixels;
  arranging and storing the pixel value of each of the pixels of the image acquisition device corrected in the correcting at a storage area corresponding to the shift direction and shift amount of the image acquisition device shifted in the shifting; and
  compositing the pixel values of the plurality of pixels stored in the storing, thereby generating a high-resolution image having a higher resolution than a resolution of the image acquisition device, wherein:
in the shifting, the image acquisition device is shifted such that a plurality of pixel values that correspond to a specific color of at least one type of the color filters provided for the normal image-acquisition pixels and that include the pixel value of at least one of the normal image-acquisition pixels exist at a same pixel position as the phase-difference detection pixel in the high-resolution image,
in the compositing, the plurality of pixel values corresponding to the specific color are composited at a predetermined compositing ratio, and
in the compositing, the compositing ratio is controlled based on a contrast at a position corresponding to at least the phase-difference detection pixel in the high-resolution image.

5. A non-transitory computer-readable storage medium having an image obtaining program stored thereon, the image obtaining program being executable by a hardware processor to control the hardware processor to perform:
shifting an image acquisition device that includes normal image-acquisition pixels periodically provided with color filters having a plurality of colors and a phase-difference detection pixel used for focus detection, in a predetermined shift direction by a shift amount in units of subpixels;
correcting, through interpolation, a pixel value obtained by the phase-difference detection pixel to a value equivalent to values obtained by the normal image-acquisition pixels;
arranging and storing the pixel value of each of the pixels of the image acquisition device corrected in the correcting at a storage area corresponding to the shift direction and shift amount of the image acquisition device shifted in the shifting; and
compositing the pixel values of the plurality of pixels stored in the storing, thereby generating a high-resolution image having a higher resolution than a resolution of the image acquisition device, wherein:

in the shifting, the image acquisition device is shifted such that a plurality of pixel values that correspond to a specific color of at least one type of the color filters provided for the normal image-acquisition pixels and that include the pixel value of at least one of the normal image-acquisition pixels exist at a same pixel position as the phase-difference detection pixel in the high-resolution image, in the compositing, the plurality of pixel values corresponding to the specific color are composited at a predetermined compositing ratio, and in the compositing, the compositing ratio is controlled based on a contrast at a position corresponding to at least the phase-difference detection pixel in the high-resolution image.

\* \* \* \* \*